United States Patent [19]

Van Den Brandt

[11] Patent Number: 4,983,032

[45] Date of Patent: Jan. 8, 1991

[54] PROJECTION SYSTEM

[75] Inventor: Adrianus H. J. Van Den Brandt, Eindhoven, Netherlands

[73] Assignee: U.S. Philips Corporation, New York, N.Y.

[21] Appl. No.: 463,752

[22] Filed: Jan. 12, 1990

Related U.S. Application Data

[63] Continuation-in-part of Ser. No. 327,288, Mar. 22, 1989.

[30] Foreign Application Priority Data

Sep. 1, 1989 [NL] Netherlands ............... 8902205

[51] Int. Cl.$^5$ .................. G03B 21/00; G02F 1/13
[52] U.S. Cl. .............................. 353/30; 353/31; 353/33; 353/34; 353/37; 358/60
[58] Field of Search ................ 353/34, 33, 31, 30, 353/37, 81, 122; 358/60, 61

[56] References Cited

U.S. PATENT DOCUMENTS

| | | | |
|---|---|---|---|
| 4,127,322 | 11/1978 | Jacobson et al. | 353/37 |
| 4,464,019 | 8/1984 | Gagnou | 353/31 |
| 4,749,259 | 6/1988 | Ledebuhr | 353/33 |
| 4,836,649 | 6/1989 | Ledebuhr et al. | 353/31 |
| 4,850,685 | 7/1989 | Kamakura et al. | 353/31 |
| 4,913,528 | 4/1990 | Hasegawa | 353/60 |

OTHER PUBLICATIONS

IBM Technical Disclosure Bulletin, vol. 22, No. 2 (Jul. 1979), pp. 820–821.

Primary Examiner—William A. Cuchlinski, Jr.
Assistant Examiner—William C. Dowling
Attorney, Agent, or Firm—Bernard Tiegerman

[57] ABSTRACT

A projection system comprises a plurality of reflective LCDs (41, 42, 43) which are irradiated with colored sub-beams (21, 22, 23). The sub-beams are not perpendicularly incident on the LCDs so that the reflected beams (24, 25, 26) do not coincide with the incident beams. The sub-beams originate from a white light beam (20) which is split up into colored sub-beams by means of color-selective mirrors (31, 33). The same mirrors are used to combine the reflected beams (24, 25, 26) to a projection beam (27). An angle-dependent beam separater (80) is arranged so as to realize a spatial separation between the incident beams and the reflected beam. The angle-dependent beam separater (80) is arranged in such a way that the angle at which the beam (20) is incident on the color-selective mirrors (31, 33) is equal to the angle at which the reflected sub-beams (24, 25, 26) are incident on these mirrors.

7 Claims, 3 Drawing Sheets

PROJECTION SYSTEM

CROSS-REFERENCES TO RELATED APPLICATIONS

This is a continuation-in-part of U.S. application Ser. No. 327,288 filed by Adrianus H. J. Van den Brandt on Mar. 22, 1989.

BACKGROUND OF THE INVENTION

1. Field of the Invention

The invention relates to a projection system comprising a radiation source unit for generating a radiation beam, a modulation system for modulating the radiation beam in accordance with a picture to be displayed, and a projection lens system for projecting the picture to be displayed on a projection screen, said modulation system comprising at least one color selective mirror for splitting the radiation beam into sub-beams, and at least a first and a second reflective light valve for reflecting and modulating the sub-beams. The invention also relates to a modulation system for use in such a projection system.

2. Art Background

A projection system is used for large format display of a picture, for example a television or video program but, for example also for visually displaying a picture generated by a computer such as text, illustrations or other data. The picture is projected on a screen which is visible to the viewer, which screen may be a rear projection screen which is connected, for example fixedly to the projection system and forms an assembly therewith, or as a front projection screen which is not directly coupled to the projecter.

A projection system as described in the opening paragraph is known from U.S. Pat. No. 4,191,456. The system described in this patent comprises a light source and a polarization-sensitive beam splitter with which a linearly polarized radiation beam is generated. This beam is split up by means of two color-selective mirrors into three sub-beams for the primary colors blue, green and red. Each sub-beam is directed to a relective light valve via a neutral and a polarization-sensitive mirror. The light valve operates as a mirror in which, depending on the picture to be displayed, the direction of polarization of portions of the reflected beam is rotated. The reflected sub-beam again traverses the polarization-sensitive mirror, while the portions whose direction of polarization is rotated are separated from the rest of the sub-beam. The sub-beams with the rotated polarization are combined to a beam by means of a second set of color-selective mirrors, which beam is projected on the screen by means of a projection lens.

The known projection system is not compact. The radiation paths for the radiation beams to the light valves extend parallel to the radiation paths for the reflected beams. Thus, a large part of the system is duplicative. Particularly, the sysiem comprises two sets of color-selective mirrors. Such mirrors are sensitive to the direction of polarization of the incident radiation so that these mirrors cannot be replaced without any light and quality loss by single sets which is arranged in radiation paths of both the ongoing and the reflected beams.

A further drawback is that the known projection system uses relatively expensive polarization-sensitive beam splitters for separating the beams incident on the light valves and the beams reflected by the light valves. Since tbe optimization of the color-selective mirrors requires that the separation of the incident and reflected beams takes place between the light valves and the color-selective mirrors, these polarization-sensitive beam splitters are necessary.

SUMMARY OF THE INVENTION

It is one of the objects of the invention to provide a projection system which is considerably more compact than the known system and in which only one set of color-selective mirrors is sufficient which set serves both for splitting the beam generated by the radiation source into color sub-beams and for combining the sub-beams reflected and modulated by the light valves without any loss of quality and light.

To this end the projection system according to the invention is characterized in that the axes of the radiation paths of the radiation beams incident on the light valves and reflected by the light valves extend at an angle to the respective normals of the planes of the light valves. The axes of the radiation paths are understood to mean the lines along which the chief rays of the beams propagate since the radiation beam incident on the light valve is obliquely incident and hence the reflected beam is obliquely reflected, the two beams are separated so that a polarization-sensitive beam splitter can be dispensed with. It is therefore possible to form the light valves in such a way that the modulated radiation beam has the same direction of polarization as the incident radiation beam. A color-selective mirror which is optimized for the one sub-beam is then also optimized for the other sub-beam. The projection system according to the invention is therefore further characterized in that the color-selective mirror is arranged in the radiation path on both the radiation beams incident of the light valves and the radiation beams reflected by the light valves. Both the second set of color-selective mirrors and the polarization-sensitive beam splitters can thus be dispensed with. For selecting the desired part of the reflected beam from the unwanted part, a polarization filter can be used which is arranged in the light valve and which serves as a polarizer for the incident beam and as an analyser for the reflected beam.

It is to be noted that it is known per se from EP-A No. 0,166,194 to use an obliquely incident radiation beam with a reflective light valve. However, in the known arrangement a plurality of radiation sources each having a colored filter is used. Furthermore, a separate color-selective mirror is provided which is only used for combining the sub-beams.

In the projection system known from EP-A No. 0,166,194 the projection lens is arranged between the light valve and the color-selective mirror. Consequently, a relatively large color-selective mirror is required. Due to this fact and due to the presence of a plurality of radiation sources the known projection system is considerably less compact than the projection system according to the invention.

The projection system according to the invention is preferably characterized in that it comprises an angle-dependent beam separator for separating the incident and the reflected radiation beams. Consequently, also at a small angle between the incident and reflected beams, a compact projection system can be realised in which the angle-dependent beam separator provides for a sufficient spatial separation between the two beams.

The projection system according to the invention is further characterized in that the color-selective mirror is arranged in the radiation path between the reflective light valves and the angle-dependent beam separator. By arranging the angle-dependent beam separator at this location in the radiation paths, only one beam separator is required.

An embodiment of the projection system according to the invention is further characterized in that a first plane in which the axes of the radiation paths of the sub-beams incident on the first light valve and reflected thereby are located and a second plane in which the radiation paths of the sub-beams incident on the second light valve and reflected thereby are located extend at an angle of more than zero. If the incident radiation beam is incident on the color-selective mirror, the rays of this beam extend at a given angle to the plane of the mirror. Also the beams reflected by the light valves extend at an angle to the plane of the color-selective mirror. These two angles are generally unequal in the case of oblique incidence on the light valves. Since the transmission/reflection characteristic of a color-selective mirror is angle-dependent, not all radiation reflected on the on-going path is also reflected on the return path. The same also applies to the radiation passed by the mirror. As a result some loss of radiation and quality occurs. This effect is limited by the above-mentioned measure.

The radiation loss due to the difference in angles of incidence disappears completely if the beams incident on the light valves and reflected thereby are located in a plane which is parallel to the line of intersection of the planes of the color-selective mirror and the light valves. The projection system is therefore preferably further characterized in that the said first plane and the said second plane intersect each other in accordance with a line of intersection which is parallel to a line of intersection of a plane of the color-selective mirror and a plane of a reflective light valve.

A further preferred embodiment of the projection system according to the invention has a modulation system comprising two color-selective mirrors for modulating the three sub-beams with parts of a picture to be displayed.

BRIEF DESCRIPTION OF THE DRAWINGS

These and other (more detailed) aspects of the invention will now be described in greater detail with reference to the accompanying drawings and embodiments.

The invention is illustrated in the drawings in which.

The Figures use equal reference signals for comparable elements.

DETAILED DESCRIPTION

Figure 1:
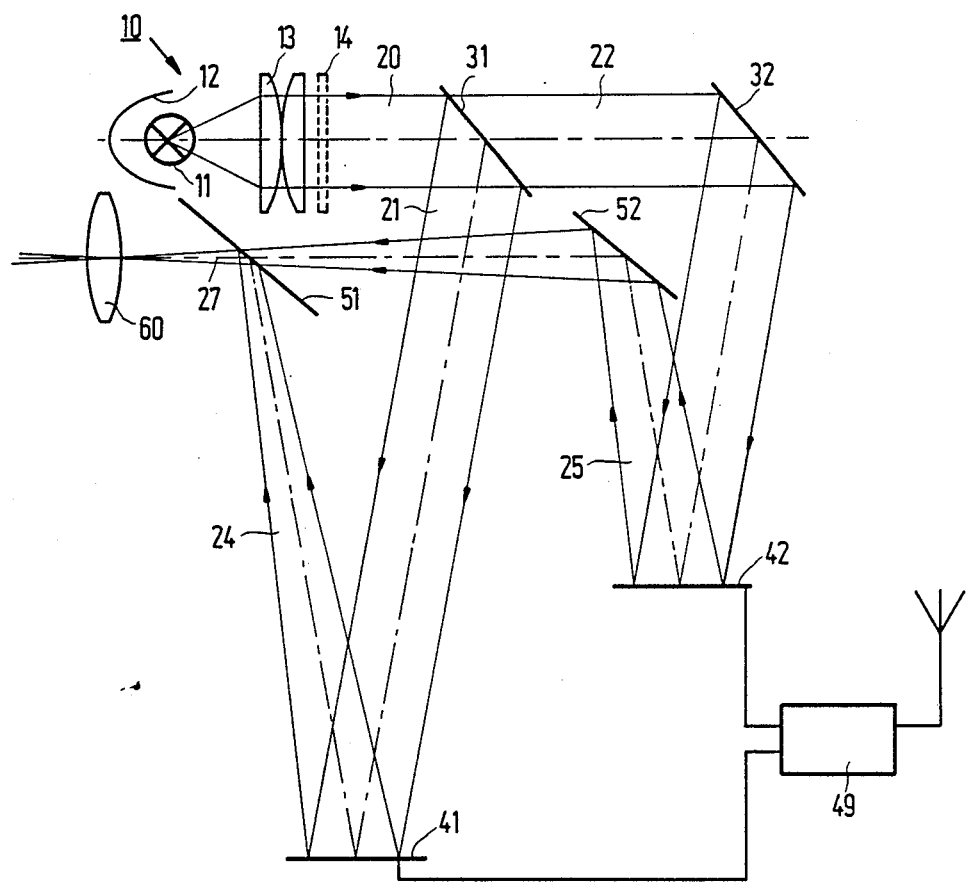
FIG. 1 shows a projection system using beam separation by means of oblique incidence of the sub-beams.

FIG. 1 shows diagrammatically a projection system according to the invention. The radiation source unit 10 comprises a lamp 11. A reflector 12 with which the light radiated backwards is reflected is arranged behind the lamp. A condenser system 13 with which the light emitted by the lamp 11 and reflected by the reflector 12 is focused in a radiation beam 20 is arranged in front of the lamp. A radiation source unit of different design may alternatively be used. A radiation beam 20 is incident on a color-selective mirror 31 which is transparent to light in a first wavelengthband and reflective to light in a second wavelengthband. The beam is thus split up into two sub-beams 21 and 22 each having a different color. The sub-beam 21 is subsequently incident on a reflective light valve 41, for example a reflective liquid crysial display panel (LCD). The sub-beam 22 which is passed by the mirror 31 is guided towards a second light valve 42 via a reflecting mirror 32. The mirror 32 may be a neutral mirror or a mirror which is optimized for the wavelength range of the sub-beam 22.

The light valves or LCDs 41 and 42 are locally made reflective or non-reflective via a drive circuit 49 in accordance with a picture to be displayed which picture may form part of a television or video program or which may originate from another source, for example a computer generating text or other graphic information. The radiation from the sub-beams 21 and 22 reflected by the light valves 41 and 42 forms sub-beams 24 and 25 which are modulated in accordance with a picture to be displayed. The beam 25 is guided by a mirror 52 to the color-selective mirror 51 where the beams 24 and 25 are combined to a compostie beam 27 and projected by means of the projection lens system 60 on a projection screen not shown. Like the mirror 31 the mirror 51 is reflective to the wavelengthband of the radiation in the beam 24 and transparent to the wavelengthband of the sub-beam 25. The mirror 52 may be a neutral mirror or optimized for radiation in the wavelengthband of the beam 25.

In practice the liquid crystal display panel (LCD) will be used as a reflective light valve. This operates with polarized light. The radiation source unit may therefore already accommodate the polarization filter 14 so that the radiation beam 20 only comprises polarized light of the correct direction of polarization. The mirrors 31, 32, 51 and 52 are further preferably optimized for this direction of polarization. The light source unit 10 may be formed in such a manner that the fraction of the radiation emitted by the light source and having the wrong direction of polarization is converted into light having the correct direction of polarization. Such a light source unit is known from FIG. 22 of EP-A No. 0,258,927. The mirrors 31, 32, 51 and 52 are further preferably optimized for this direction of polarization.

The projection system is preferably formed in such a way that the optical distance between the projection lens system 60 and each one of the light valves 41 and 42 is equal. The projection system of FIG. 1 only shows two light valves. It will be clear to those skilled in the art that more light valves can be added without any problem, for example, for obtaining a system with three colors and/or for giving the system a double design, with the second design using the other direction of polarization. For example, a stereo projector may be obtained therewith, using only one light source.

Figure 2:
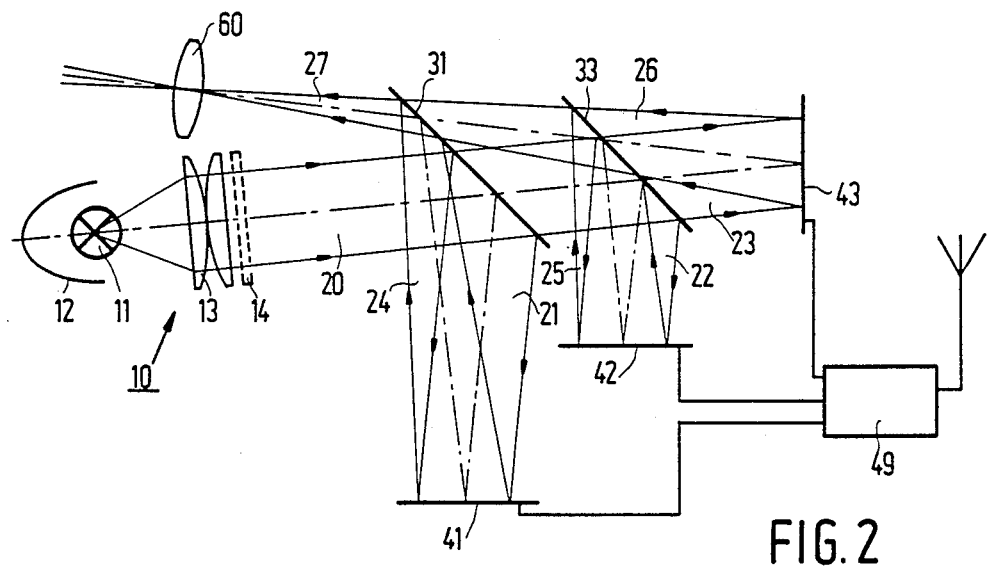
FIG. 2 shows an embodiment of a projection system in which the color-selective mirrors are arranged both in the radiation path of the incident beams and those of the reflected beams.

FIG. 2 shows an embodiment of the projection system according to the invention in which the same color-selective mirror is used to split the incident radiation beam and to combine the reflected and modulated sub-beams. In this Figure the reference numeral 10 denotes a radiation source unit which generates and emits a radiation beam 20.

The radiation beam traverses two color-selective mirrors 31 and 33. Of these two mirrors, for example mirror 31 is reflective to red light and transparent to light having a shorter wavelength. The mirror 33 is transparent to blue light and reflective to longer wavelengths. The beam 20 is split into three sub-beams, a red sub-beam 21, a green sub-beam 22 and a blue sub-beam 23 by the two mirrors 31 and 33. The sub-beams are subsequently reflected on three reflective LCDs 41, 42 and 43, respectively. Each one of the three LCDs is driven via the control circuit 49 with the "red", "green" or "blue" portions of a video signal to be displayed so that the sub-beams 24, 25 and 26 reflected by the LCDs are modulated with the color components of the video signal.

The sub-beams 24, 25 and 26 are combined via the color-selective mirrors 31 and 33 to a composite beam 27 which is projected on a screen via the projection lens system 60.

Figure 3:
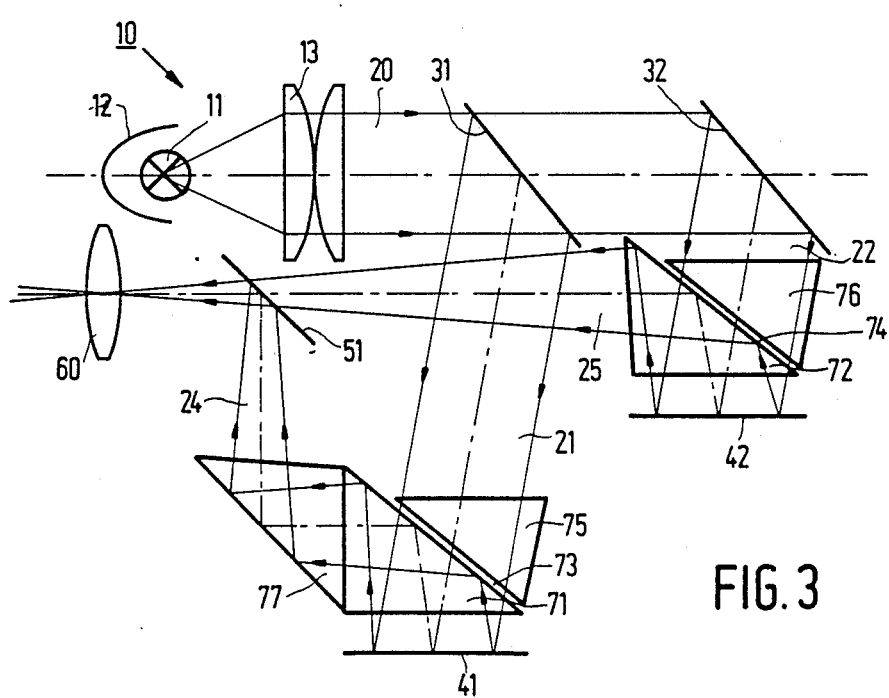
FIG. 3 shows a projection system in which an angle-dependent beam separator is used.

In the embodiments of FIGS. 1 and 2 it is necessary to give the radiation path of the radiation beam such a length that the radiation source unit is not placed in the returning radiation beam 27 and that the projection lens system does not shield the emitted radiation beam 20. This imposes restrictions on the possibilities of reducing the projection system. FIG. 3 shows a projection system in which the spatial separation between the incident and reflected radiation beams is obtained by means of an angle-dependent beam separator. The radiation beam 20 generated in the radiation source unit 10 is split into two colored sub-beams 21 and 22 by the color-selective mirror 31. These two beams are incident on the light valves or LCDs 41 and 42 where they are modulated in accordance with a picture to be displayed. The incident beams 21 and 22 traverse the angle-dependent beam separators each of which comprises two prisms 71 and 75 and 72 and 76, respectively. Each of the main prisms 71 and 72 is arranged in the radiation path of the corresponding incident beam as well as that of the beam reflected by the corresponding LCD. One of the faces of the prisms, the faces denoted by 73 and 74, are oriented in such a way that total internal reflection (TIR) occurs thereon of the radiation beams 24 and 25 reflected by the LCD 41 or 42. Two auxiliary prisms 75 and 76 are arranged opposite these faces 73 and 74 in such a way that an air gap remains beside the faces 73 and 74. These auxiliary prisms compensate the refractive effect of the main prism on the incident radiation beams 21 and 22 so that the beam separators have the effect of plano parallel plates on the incident beams. Since the incident beams extend at a different angle to the air gap than the reflected beams, the total internal reflection only occurs in the reflected beams.

To minimize the distortion of the reflected radiation beams 24 and 25, the exit face of the main prisms is not perpendicular to the optical axis of the emerging beams but extends at an angle thereto which is equal to the angle of the optical axis with respect to the entrance faces. As a result the prisms 71 and 72 also have the effect of a plano parallel plate on the reflected beams 24 and 25.

An extra prism 77 for reflecting the beam 24 is arranged against the main prism 71 in the beam 24 reflected by the light valve 41. As a result this beam can be combined via the color-selective mirror 51 with the beam 25 from the light valve 42 and together they can be projected on a screen (not shown) via the projection lens system 60. The prism 77 may be integrated with a prism 71 in a single block of glass. The air gap between the prisms 71 and 75 and between the prisms 72 and 76 may be filled with a material having a sufficiently small refractive index comparable to that of the material of the prisms for TIR to occur.

Figure 4:
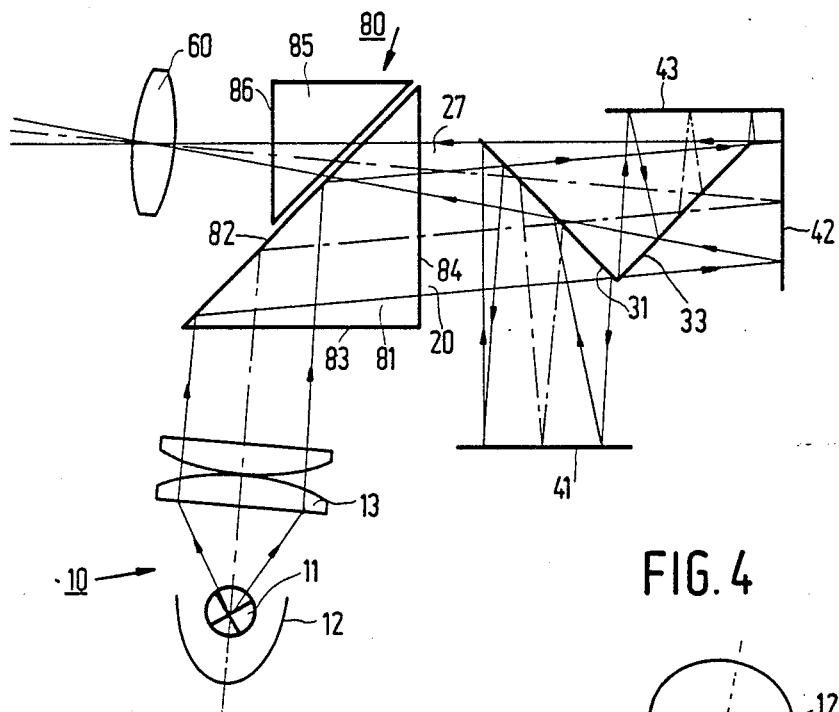
FIG. 4 shows an embodiment in which the color-selective mirrors are situated between the angle-dependent beam separator and the light valves.

FIG. 4 shows a modification of this embodiment in which only one angle-dependent beam separator is used which is arranged in the radiation paths of the incoming and reflected beams between the radiation source unit and the projection lens system at one end and the color-selective mirrors at the other end.

As in the previous Figures a radiation source unit 10 is shown with which a radiation beam 20 is generated. The radiation beam 20 is reflected through approximately 90° in the angle-dependent beam separator 80 and is incident on the color separation and modulation system. This system comprises two color-selective mirrors 31 and 33 and three reflective light valves 41, 42 and 43. The operation of this system will be clear after the foregoing and will therefore not be described in greater detail. The modulated beam 27 from the light valves is incident on the face 84 of the main prism 81 of the beam separator, is subsequently incident on the face 82 at an angle at which there is no total internal reflection, traverses the auxiliary prism 85 and leaves the beam separator 80 through the face 86. The picture to be displayed is displayed on a projection screen via the projection lens system 60.

A very compact projection system is obtained by arranging the angle-dependent beam separator between the modulation system and the projection lens system.

The embodiments described hereinbefore have the drawback that the sub-beams incident on the reflective light valves and reflected thereby extend at different angles to the color-selective mirrors. Since the color separation in such mirrors is dependent on the angle of incidence, the color separation and color recombination occurs at different cut-off wavelengths. The cut-off wavelength is the wavelength at which half the radiation is passed and the other half is reflected. The cut-off wavelength of the color-selective mirror has an angle dependence which varies by approximately 1 to 2 nm per degree.

Figure 5:
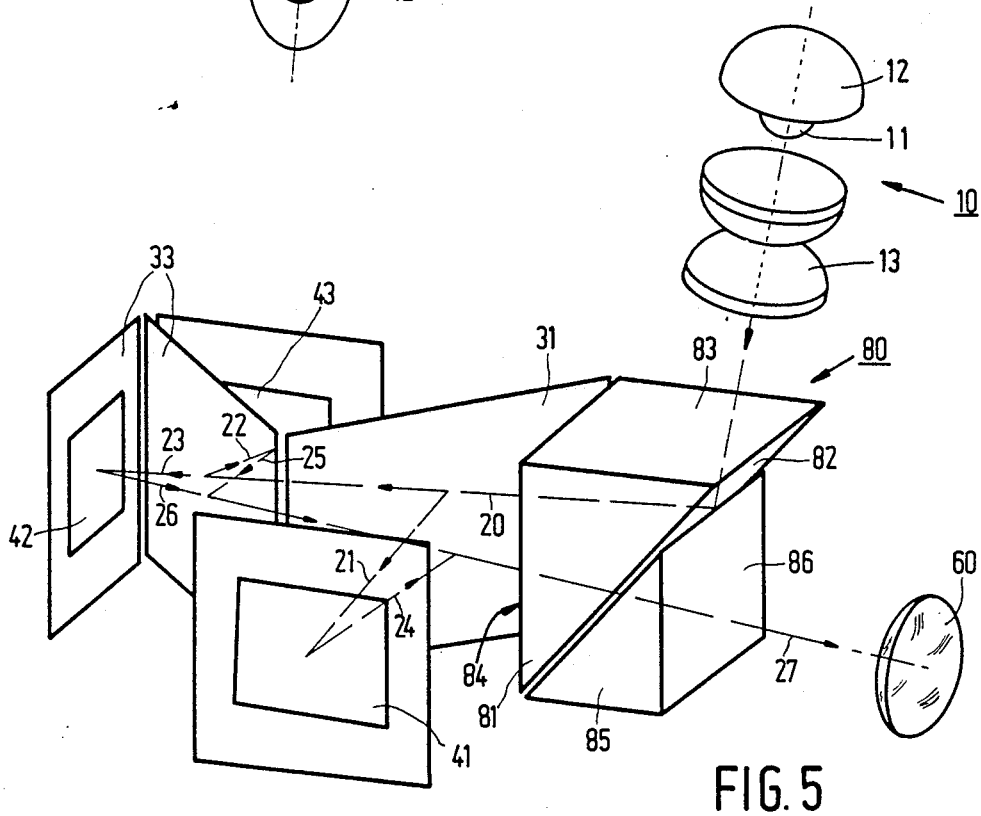
FIG. 5 shows a preferred embodiment of the projection system according to the invention.

Since an angle difference of approximately 10° causes the cut-off wavelength to shift by approximately 10 to 20 nm, there is loss of quality and light in the picture io be displayed. FIG. 5 shows an embodiment of a projection system according to the invention in which the incoming and outgoing beams are incident on the color-selective mirrors at the same angle. For the sake of clarity this drawing is 3 dimensional and it shows only the chief rays of the light beams. As compared with the system shown in FIG. 4, the color separation and modulation system is rotated with respect to the angle-dependent beam separator 80 by approximately 90° around an axis which coincides with the bisectrix of the chief rays of the beam 20 facing the modulation system and the beam 27 originating therefrom. This rotation results in the plane being subtended by the chief rays of a sub-beam incident on a light valve and in the sub-beam reflected by this light valve no longer coinciding with the plane added in the same way to another light valve but extending at an angle thereto. In the case of a rotation of 90° as shown in FIG. 5 of the angle-dependent beam separator these subtended planes are parallel to the light of intersection of the planes of the light valves and the color-selective mirrors. Since the chief rays of the radiation beams now extend at the same angle to the normals of the color-selective mirrors 31 and 33, the cut-off wavelength of these mirrors is equal for the incident beams as well as the reflected beams and there is no color change in the displayed picture.

For reasons of other considerations it is of course possible to have the rotation of the angle-dependent beam separator to be less than 90° and to have this element thus occupy an intermediate position between the embodiment shown in FIGS. 4 and 5. In this case there will still be a difference in cut-off wavelengths, which is, however, smaller than in the situation in which the chief rays of all beams are located in one plane.

What is claimed:

1. A projection system comprising a radiation source unit (10) for generating a radiation beam (20), a modulation system for modulating the radiation beam in accordance with a picture to be displayed, and a projection lens system (60) for projecting the picture to be displayed on a projection screen, said modulation system having at least one color-selective mirror (31) for splitting the radiation beam to sub-beams (21, 22) and at least a first and a second reflective light valve (41, 42) for reflecting and modulating the sub-beams (24, 25), characterized in that the axes of the radiation path of the radiation beams incident on the light valves (41, 42) and reflected by the light valves extend at an angle to the respective normals of the planes of the light valves.

2. A projection system as claimed in claim 1, characterized in that the color-selective mirror (31, 33) is arranged in the radiation path of both the radiation beams incident on the light valves and the beams reflected by the light valves.

3. A projection system as claimed in claim 1, characterized in that the projection system comprises an angle-dependent beam separator (71, 75; 72, 76; 80) for separating the incident and reflected radiation beams.

4. A projection system as claimed in claim 3, characterized in that the color-selective mirror (31, 33) is arranged in the radiation path between the reflective light valves (41, 42, 43) and the angle-dependent beam separator (80).

5. A projection system as claimed in claim 1, characterized in that a first plane in which the axes of the radiation path of the sub-beams (22, 25) incident on the first light valve and reflected thereby are located and a second plane in which the radiation path of the sub-beams (23, 26) incident on the second light valve and reflected thereby are located, extend at an angle of more than zero.

6. A projection system as claimed in claim 5, characterized in that the said first plane and the said second plane intersect each other in accordance with the line of intersection which is parallel to a line of intersection of a plane of the color-selective mirror and a plane of a reflective light valve.

7. A projection system as claimed in claim 1, in which the modulation system has two color-selective mirrors (31, 33) for splitting the radiation beam generated by the radiation source unit into a red, a green and a blue sub-beam and three reflective light valves (41, 42, 43) for modulating the three sub-beams with parts of a picture to be displayed.

* * * * *

EX PARTE REEXAMINATION CERTIFICATE (8232nd)

United States Patent
Van Den Brandt

(10) Number: US 4,983,032 C1
(45) Certificate Issued: May 17, 2011

(54) PROJECTION SYSTEM

(75) Inventor: Adrianus H. J. Van Den Brandt, Eindhoven (NL)

(73) Assignee: U.S. Philips Corporation, New York, NY (US)

Reexamination Request:
No. 90/010,719, Oct. 16, 2009

Reexamination Certificate for:
Patent No.: 4,983,032
Issued: Jan. 8, 1991
Appl. No.: 07/463,752
Filed: Jan. 12, 1990

Related U.S. Application Data

(63) Continuation-in-part of application No. 07/327,288, filed on Mar. 22, 1989, now Pat. No. 4,969,730.

(51) Int. Cl.
*H04N 9/31* (2006.01)

(52) U.S. Cl. .............. 353/30; 353/31; 353/33; 353/34; 353/37; 348/751; 348/757; 348/E9.027

(58) Field of Classification Search ............ 353/30
See application file for complete search history.

(56) References Cited

U.S. PATENT DOCUMENTS

| | | | |
|---|---|---|---|
| 3,893,758 A | 7/1975 | Hunzinger et al. |
| 4,127,322 A | 11/1978 | Jacobson et al. |
| 4,552,441 A | 11/1985 | Dewey |
| 4,687,301 A | 8/1987 | Ledebuhr |
| 4,749,259 A | 6/1988 | Ledebuhr |
| 4,836,649 A | 6/1989 | Ledebuhr et al. |
| 4,850,685 A | 7/1989 | Kamakura et al. |
| 4,913,528 A | 4/1990 | Hasegawa |
| 4,936,656 A | 6/1990 | Yamashita et al. |

FOREIGN PATENT DOCUMENTS

| | | |
|---|---|---|
| EP | 0166194 A | 1/1986 |
| JP | S63-292892 | 11/1988 |

OTHER PUBLICATIONS

Stephany, U.S. Defensive Publication No. T938,006, Imaging System, filed Oct. 11, 1974, published Sep. 2, 1975, including file history.

IBM Technical Disclosure Bulletin, vol. 22, No. 2 (Jul. 1979), pp. 820–821.

*Primary Examiner*—Anjan K. Deb

(57) ABSTRACT

A projection system comprises a plurality of reflective LCDs (41, 42, 43) which are irradiated with colored sub-beams (21, 22, 23). The sub-beams are not perpendicularly incident on the LCDs so that the reflected beams (24, 25, 26) do not coincide with the incident beams. The sub-beams originate from a white light beam (20) which is split up into colored sub-beams by means of color-selective mirrors (31, 33). The same mirrors are used to combine the reflected beams (24, 25, 26) to a projection beam (27). An angle-dependent beam separater (80) is arranged so as to realize a spatial separation between the incident beams and the reflected beam. The angle-dependent beam separater (80) is arranged in such a way that the angle at which the beam (20) is incident on the color-selective mirrors (31, 33) is equal to the angle at which the reflected sub-beams (24, 25, 26) are incident on these mirrors.

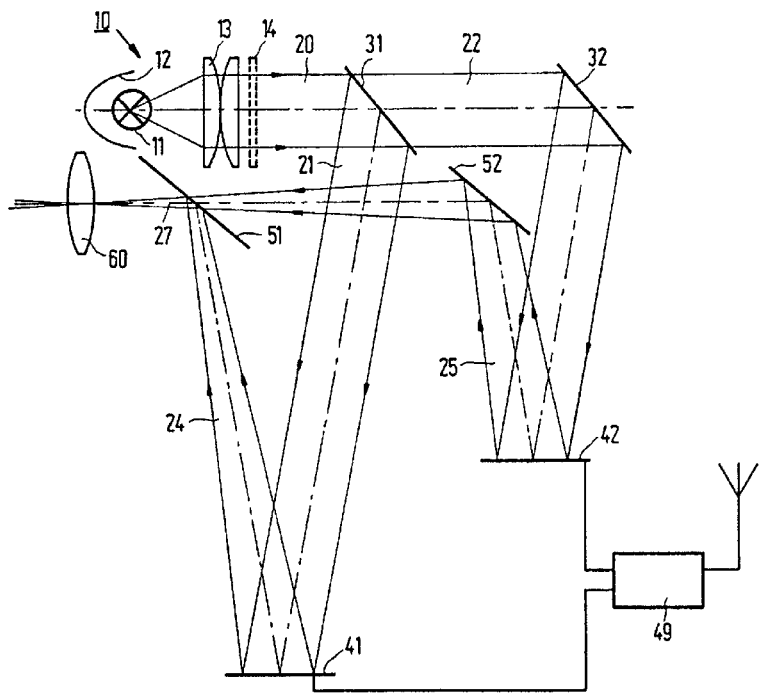

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *